United States Patent [19]

Chen

[11] Patent Number: 5,433,534
[45] Date of Patent: Jul. 18, 1995

[54] FASTENING DEVICE OF BICYCLE PEDAL AXLE

[76] Inventor: Chia-Ching Chen, 307, Chieh-Shou Villiage, Changhua City, Taiwan

[21] Appl. No.: 293,595

[22] Filed: Aug. 22, 1994

[51] Int. Cl.⁶ ............................................. F16C 35/06
[52] U.S. Cl. .................................. 384/545; 384/540
[58] Field of Search ............ 384/545, 906, 544, 540, 384/542, 537; 74/594.1

[56] References Cited

U.S. PATENT DOCUMENTS

| | | | |
|---|---|---|---|
| 627,962 | 7/1899 | Allen | 384/545 |
| 638,222 | 12/1899 | Engels | 384/545 |
| 3,915,523 | 10/1975 | Shank | 384/540 |
| 5,207,118 | 4/1993 | Chen | 74/594.1 |
| 5,209,581 | 5/1993 | Nagano | 384/540 X |

*Primary Examiner*—Thomas R. Hannon
*Attorney, Agent, or Firm*—Larson and Taylor

[57] ABSTRACT

A fastening device of bicycle pedal axle comprises an outer sleeve, a locating sleeve, and a fastening ring. The pedal axle is held securely by the outer sleeve and the locating sleeve, which are in turn fastened securely together by the fastening ring having a plurality of retaining projections which are inserted into the insertion slots of the outer sleeve and the locating sleeve.

1 Claim, 4 Drawing Sheets

FASTENING DEVICE OF BICYCLE PEDAL AXLE

BACKGROUND OF THE INVENTION

The present invention relates generally to a bicycle pedal axle, and more particularly to a fastening device of the bicycle pedal axle.

As shown in FIG. 1, a prior art fastening device of the bicycle pedal axle comprises a plurality of balls 5A, which are contained in an inner sleeve 4A such that the bails 5A are located securely between an axle 1A and an outer sleeve 2A by means of a fastening nut 3A, Such a fastening device of bicycle pedal axle as described above is defective in design in that the fastening nut 3A is rather susceptible to becoming loosened to undermine the safety of a rider of the bicycle, and that the work of readjusting the loosened nut 3A can not be easily done because of the space limitation as well as two hand tools that are needed to perform the work of readjusting the fastening nut 3A,

SUMMARY OF THE INVENTION

It is therefore the primary objective of the present invention to provide a fastening device of the bicycle axle, which comprises a fastening ring having a plurality of retaining projections intended to fasten securely an outer sleeve and a locating sleeve, which in turn fasten the bicycle pedal axle.

The foregoing objective ,features and functions of the present invention will be more readily understood upon a thoughtful deliberation of the following detailed description of the present invention in conjunction with the accompanying drawings.

DETAILED DESCRIPTION OF THE INVENTION

Figure 1:
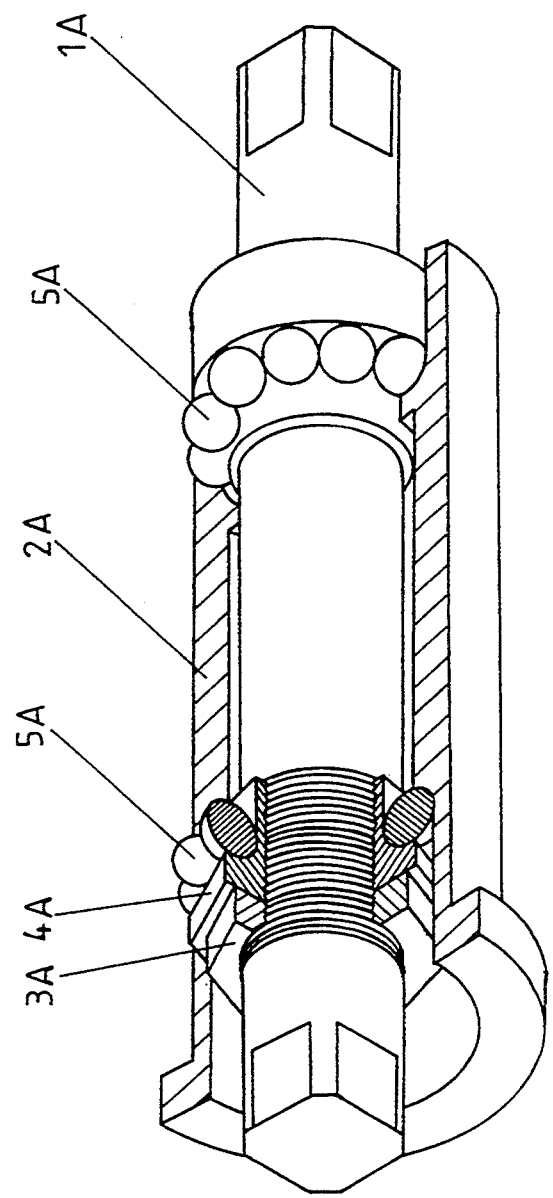
FIG. 1 shows a perspective view of a bicycle pedal axle of the prior act.
Figure 2:
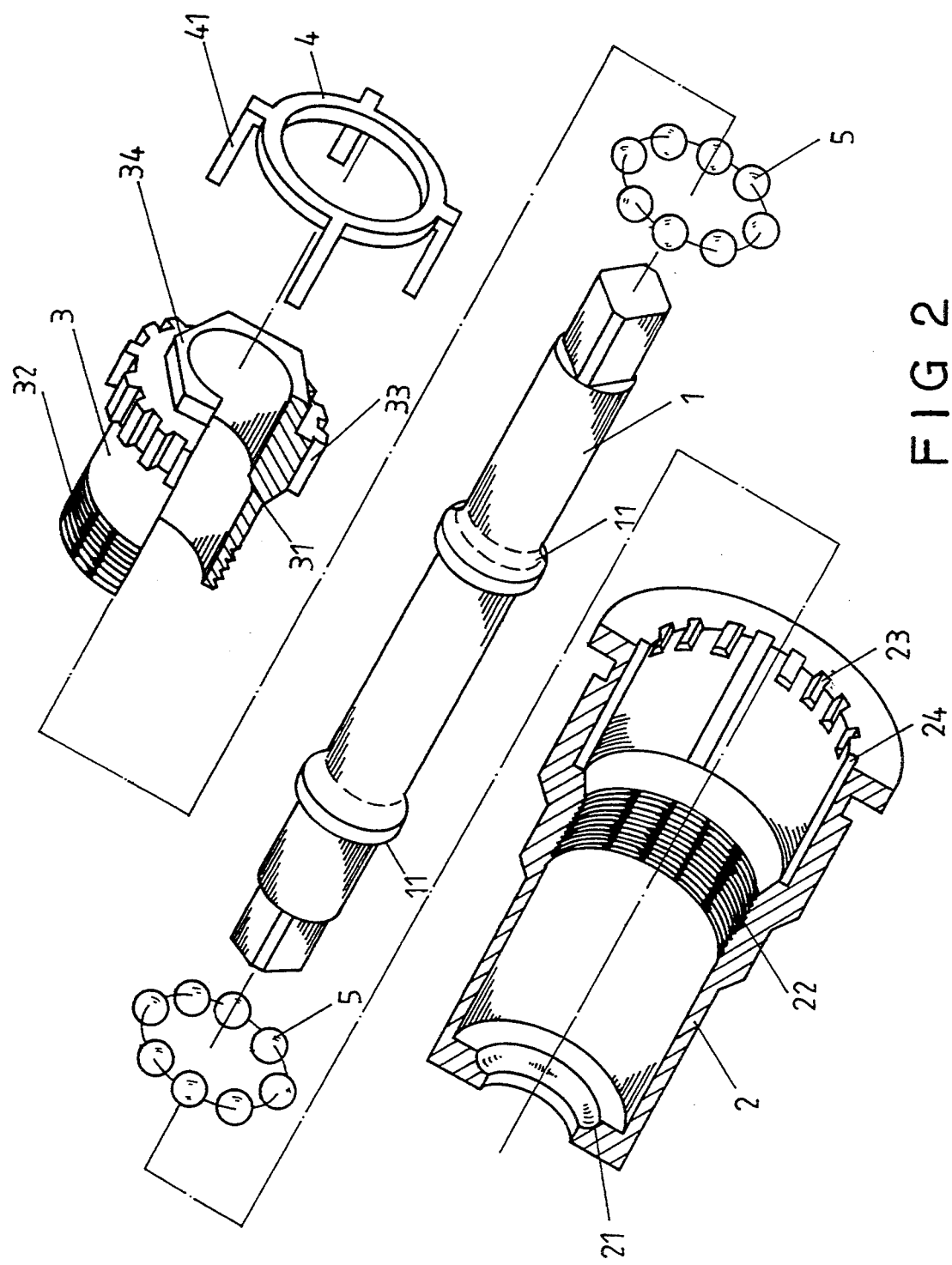
FIG. 2 shows an exploded view of a bicycle pedal axle of the present invention.

As shown in FIG. 2, a bicycle pedal axle 1 of the present invention is provided with two ball seats 11 which are spaced at an interval. The axle 1 has one end that is fitted into an outer sleeve 2 provided with a ball groove 21, female threads 22, a plurality of slots 23, and a plurality of symmetrical insertion slots 24 of a predetermined depth. The axle 1 has another end that is fitted into a locating sleeve 3 which is provided therein with a ball groove 31,male threads 32, a plurality of insertion slots 33, and a hexagonal nut 34. The outer sleeve 2 and the locating sleeve 3 are fastened by means of a fastening ring 4 having a plurality of retaining projections 41 which are spaced equidistantly.

Figure 3:
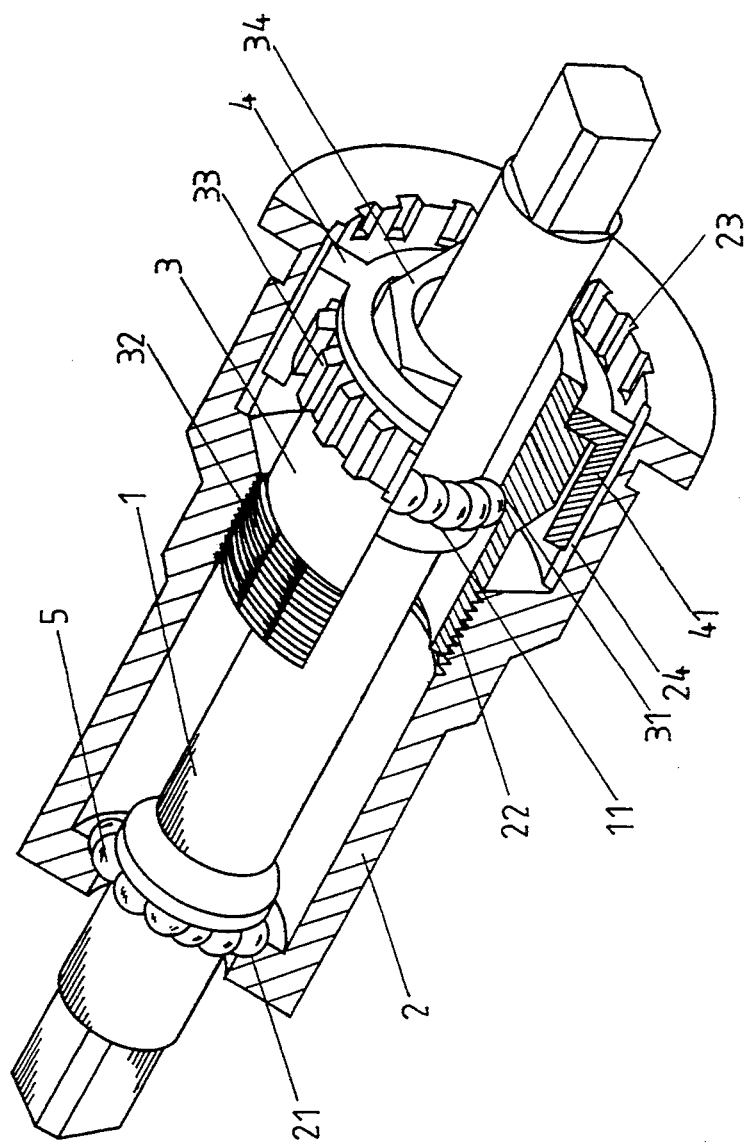
FIG. 3 shows a perspective view of the bicycle pedal axle in combination according to the present invention.
Figure 4:
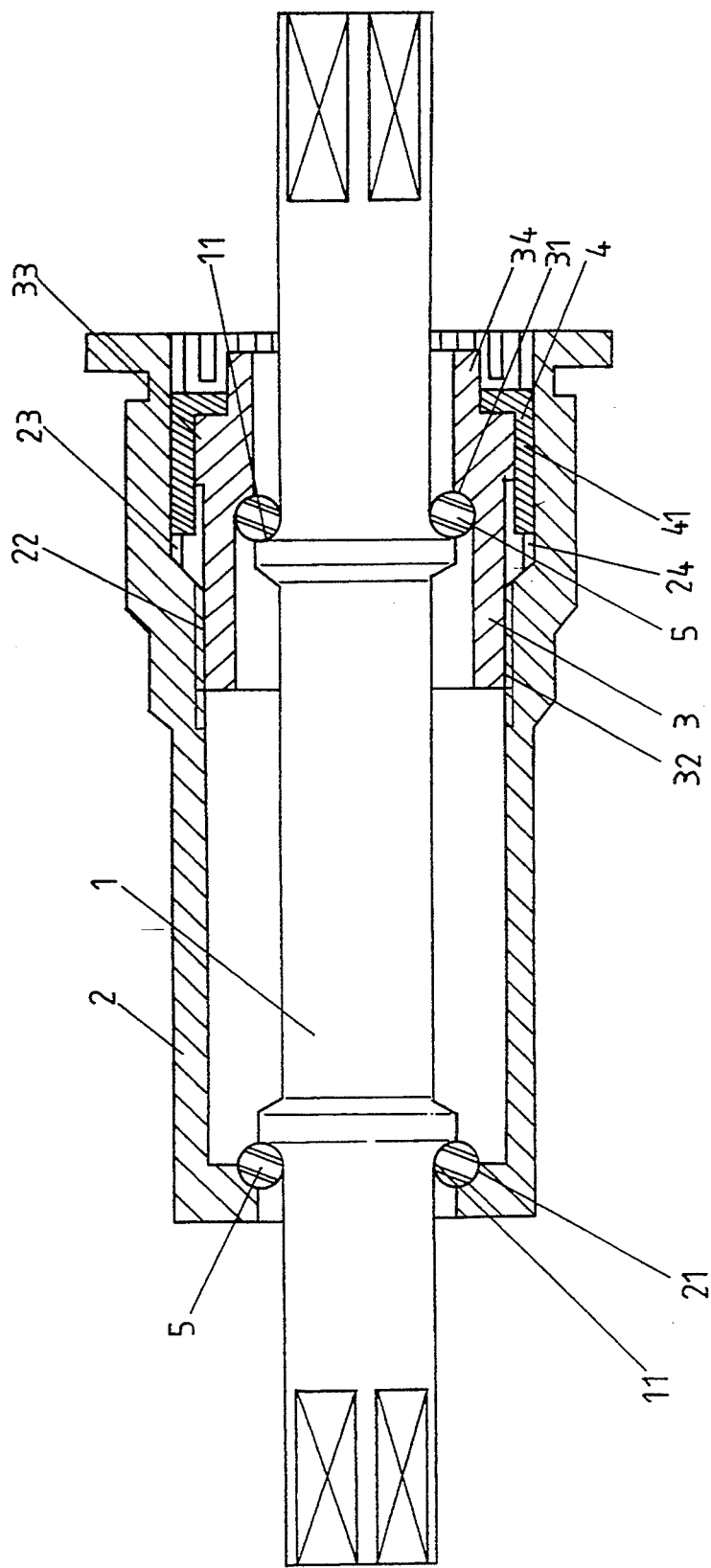
FIG. 4 shows a sectional view of a the bicycle pedal axle in combination according to the present invention.

As illustrated in FIGS. 3 and 4, the axle 1 is held securely in place in the outer sleeve 2 and the locating sleeve 3. The outer sleeve 2 and the locating sleeve 3 are fastened together such that the female threads 22 of the outer sleeve 2 engage the male threads 32 of the locating sleeve 3. The balls 5 are located in the ball seats 11, and the ball grooves 21 and 31. The outer sleeve 2 and the locating sleeve 3 are fastened securely by the fastening ring 4 whose retaining projections 41 are inserted into the insertion slots 24 of the outer sleeve 2 and the insertion slots 33 of the locating sleeve 3.

The present invention can be made integrally in quantity at a relatively low cost.

The embodiment of the present invention described above is to be regarded in all respects as merely illustrative and not restrictive. Accordingly, the present invention may be embodied in other specific forms without deviating from the spirit there,of. The present invention is therefore to be limited only by the scope of the following appended claim.

What is claimed is:

1. A fastening device of bicycle pedal axle comprising:

an axle provided with two ball seats spaced at an interval;

a plurality of balls;

an outer sleeve provided therein with a ball groove, female threads, a plurality of slots, and a plurality of insertion slots having a predetermined depth, said outer sleeve being fitted over one end of said axle;

a locating sleeve provided thereon with a ball groove, male threads, a plurality of insertion slots , and a hexagonal nut,said locating sleeve being fitted over another end of said axle; and a fastening ring having a plurality of retaining projections which are spaced equidistantly;

wherein said axle is held securely by said outer sleeve and said locating sleeve such that said female threads of said outer sleeve engage said male threads of said locating sleeve, and that said balls are located in said ball seats of said axle and in said ball grooves of said outer sleeve and said locating sleeve, and further that said retaining projections of said fastening ring are inserted into said insertion slots of said outer sleeve and said locating sleeve.

* * * * *